United States Patent [19]

Vesely

[11] 3,856,912

[45] Dec. 24, 1974

[54] RECOVERY OF PLATINUM FROM DEACTIVATED CATALYSTS

[75] Inventor: Kenneth Donald Vesely, Arlington Heights, Ill.

[73] Assignee: Universal Oil Products Company, Des Plaines, Ill.

[22] Filed: May 3, 1973

[21] Appl. No.: 357,042

[52] U.S. Cl................... 423/22, 423/472, 252/414, 75/108, 75/121
[51] Int. Cl............................................ C01g 55/00
[58] Field of Search........ 423/22, 472; 75/108, 121; 252/414

[56] References Cited
UNITED STATES PATENTS

| | | | |
|---|---|---|---|
| 2,863,760 | 12/1958 | Ashley et al. | 75/108 |
| 2,863,761 | 12/1958 | Ashley et al. | 75/108 |
| 2,894,816 | 7/1959 | Hyman et al. | 423/22 |
| 2,982,601 | 5/1961 | Wilson | 423/22 |
| 3,428,448 | 2/1969 | Bank et al. | 75/108 |

*Primary Examiner*—Herbert T. Carter
*Attorney, Agent, or Firm*—James R. Hoatson, Jr.; Robert W. Welch; William H. Page, II

[57] ABSTRACT

Trace amounts of platinum, otherwise lost, are recovered from the alum solution resulting from the digestion of spent alumina-based platinum catalyst in sulfuric acid. The alum solution is commingled with a normally liquid trialkyl phosphate and a platinum-containing residue forms at the interface of said liquids as they are allowed to settle out into an upper and lower liquid phase.

2 Claims, No Drawings

RECOVERY OF PLATINUM FROM DEACTIVATED CATALYSTS

The present invention relates to the recovery of platinum group metal components from a deactivated catalytic composite comprising the same in combination with one or more refractory inorganic oxides. A variety of commercially important hydrocarbon conversion reactions including cyclization, dehydrocyclization, isomerization, aromatization, hydrogenation, dehydrogenation, etc., as well as various oxidation and reduction reactions, are effectively catalyzed under varied conditions by catalytic composites comprising a platinum group metal component composited with a refractory inorganic oxide carrier material. The catalytic composites will in each instance gradually become deactivated and regeneration is required if the catalyst is to perform its intended function in an economical manner. Deactivation may result from a number of conditions which may be peculiar to the particular process involved. Most usually, deactivation results from an excessive deposition of carbonaceous matter and also certain metallic impurities or contaminants such as lead, antimony, arsenic, iron, copper, etc., and various compounds thereof which may occur in a hydrocarbon feed stock. In any case, the carbonaceous deposits, usually in combination with one or more of the described metal contaminants obstructs the hydrocarbon being processed from access to the active catalytic centers of the catalyst composite.

The carbonaceous material is readily removed by air oxidation of the deactivated catalyst and, to all appearances, an active catalyst is recovered. Other more recent methods, used in conjunction with air oxidation, restore the catalytic components to their initial activity. However, each regeneration produces a catalyst somewhat less stable than its predecessor and regeneration is required with increasing frequency. Eventually, regeneration is no longer economically feasible and a fresh catalyst charge is necessitated. The excessively high cost of the platinum group metal component precludes a disposition of the deactivated catalyst composite without a recovery of essentially all of said component therefrom. This is so although the platinum group metal component may be as little as only 0.05–1.0 wt. % of the catalyst composite. Although the method of this invention is further described with reference to platinum-containing catalysts, it is also employed advantageously in the recovery of other platinum group metals, i.e., palladium, iridium, osmium, rhodium, ruthenium, and particularly palladium. The described metals are generally composited with alumina, silica, zirconia, thoria, boria, or other refractory inorganic oxide, including combinations thereof such as silica-alumina, silica-zirconia, alumina-zirconia, and the like.

It is the general practice to recover the platinum group metal, for example platinum, from a deactivated catalyst, for example platinum-alumina, by initially treating said catalyst with a strong mineral acid such as sulfuric acid, hydrochloric acid, nitric acid and the like, or a strong base such as an alkali metal hydroxide solution, particularly a strong sodium hydroxide solution, capable of reacting with the alumina and forming a soluble compound thereof. With catalyst other than platinum-alumina, the acid or base employed is dependent on the refractory inorganic oxide involved. Thus, where the refractory inorganic oxide is beryllium oxide, a concentrated sulfuric acid is suitably employed, and when the refractory inorganic oxide is vanadium oxide, nitric acid is suitable. The acid or base may be employed in sufficient concentration to effect the desired reaction. Sulfuric acid in from about 25% to about 90% concentration is suitable, with 35–70% being preferred. Nitric acid in about 37% concentration is satisfactory.

Sulfuric acid is generally preferred since the desired reaction is facilitated by heat and sulfuric acid has a boiling point permitting the use of higher temperatures. The reaction is usually effected at reflux conditions with a bottom temperature being generally in the 250°–350° F. range. In most cases, the refractory inorganic oxide will be suitably digested within a period of 1 to 6 hours.

The resulting mixture consists of an insoluble platinum-containing residue and a solution of a water-soluble salt, the cation of which is derived from the refractory inorganic oxide. For example, when a deactivated platinum-alumina catalyst is reacted with sulfuric acid, the alumina is converted to aluminum sulfate which is readily soluble. The aluminum sulfate, or alum solution is separated from the platinum-containing residue by filtration, decantation, or other suitable means.

The platinum-containing residue may or may not contain carbonaceous matter depending on whether or not the carbonaceous matter was burned from the deactivated catalyst prior to treating the same with a strong acid or base as aforesaid. In any case, the residue is dried at about 212°–266° F. and, should carbonaceous matter be present, subjected to air oxidation at a temperature of from about 750° to about 1,290° F. or more.

The platinum-containing residue is further treated in accordance with prior art practice. For example, the platinum-containing residue is reacted with aqua regia wherein the hydrochloric and nitric acids are added together in a volumetric ratio of about 3:1 in an amount of at least about 1 gallon of total acid per pound of platinum contained in the residue. The aqua regia digestion is effected at a temperature of from about 165° to about 185° F. for a period of from about 1 to about 4 hours. The mixture resulting from the aqua regia digestion is filtered to remove any insoluble impurities, the filtrate being recovered and boiled down to remove the solvent and concentrate the resultant chloroplatinic acid. It is generally preferred to recover the platinum as chloroplatinic acid for ease in handling and storage. Also, chloroplatinic acid is a suitable source of platinum and affords a convenient method for utilizing the platinum in the manufacture of fresh catalyst.

Heretofore, it has been the practice to analyze the aluminum sulfate or alum solution for platinum and thereafter dispose of the solution. However, further significant quantities of heretofore undetected platinum have been discovered and recovered from the alum solution pursuant to the improvement of this invention. Thus, in one of its broad aspects, this invention relates to the recovery of a platinum group metal from a deactivated catalyst composite comprising said metal and a refractory inorganic oxide whereby said composite is dissolved in a strong mineral acid leaving a residue comprising said platinum group metal and a solution of a water-soluble salt the cation of which is derived from said refractory inorganic oxide, and embodies the improvement which comprises separating and commingling said solution with a normally liquid trialkyl phosphate, thereafter maintaining the mixture at quiescent conditions whereby an upper and lower liquid phase settles out, and separating and recovering the residual platinum group metal which collects at the interface of said liquid phases.

The problem of recovering platinum group metals from deactivated refractory inorganic oxide-based platinum group metal catalysts is most often a problem of recovering platinum from a deactivated alumina-based platinum catalyst, and in the interest of brevity as well as clarity the further description of the present invention is presented with reference thereto. Pursuant to the improvement of this invention, the aforesaid aluminum sulfate or alum solution is commingled with a normally liquid trialkyl phosphate, for example, trimethyl phosphate, triethyl phosphate, tripropyl phosphate, tributyl phosphate, tripentyl phosphate, and the like, with tributyl phosphate being especially suitable. The aluminum sulfate solution and the trialkyl phosphate are effectively commingled at ambient temperature. The particular ratio of aluminum sulfate solution to trialkyl phosphate is not critical to the separation process and may vary over a wide range. In general, about 50 volumes of aluminum sulfate solution thoroughly commingled with about 1 volume of the trialkyl phosphate will provide sufficient contact to effect the separation of trace amounts of platinum from said aluminum sulfate solution in accordance with the method of this invention.

The mixture settles rapidly into an upper and lower liquid phase upon cessation of the mixing operation with a platinum-containing residue forming at the interface. The upper liquid layer consisting of the trialkyl phosphate is readily separated for reuse, as by decantation, alone or in combination with the platinum-containing residue, the latter being subsequently recovered by filtration. The platinum-containing residue is preferably combined with the first mentioned platinum-containing residue and recovered as chloroplatinic acid as heretofore described.

One preferred embodiment of this invention relates to an improvement in the recovery of platinum from a deactivated alumina-based platinum catalyst whereby said catalyst is digested in sulfuric acid leaving a platinum-containing residue and an aluminum sulfate solution, said improvement comprising separating and commingling said solution with tributyl phosphate, thereafter maintaining the mixture at quiescent conditions whereby an upper and lower liquid phase settle out, and separating and recovering the platinum-containing residue which collects at the interface of said liquids.

The following example is presented in illustration of one preferred embodiment of this invention and is not intended as an undue limitation on the generally broad scope of the invention as set out in the appended claims.

EXAMPLE

A spent alumina-based platinum catalyst containing from 0.2 to 0.75 wt. % platinum, having been treated in a furnace to reduce the carbon level to less than 0.2 wt. %, is digested in sulfuric acid in a sealed digesting vessel for about 5 hours at 300° F. with the pressure maintained at 60 psig. The digesting vessel was thereafter cooled and depressured, and hydrazine was added as a reducing agent to convert any soluble platinum to platinum metal, and a flocculating agent was added to the mixture to facilitate settling of the platinum-containing residue over a 3–4 hour period. The aluminum sulfate solution resulting from digestion of the alumina-base is decanted through a filter and charged to storage while the platinum-containing residue is treated for the recovery of platinum as chloroplatinic acid in the conventional manner. Approximately 25,000 gallons of the aluminum sulfate solution resulting from the digestion of 21,000 pounds of spent catalyst and containing no analytically detectable platinum, is stirred vigorously in contact with 500 gallons of tributyl phosphate at ambient temperature, and the mixture thereafter allowed to settle out into an upper and lower liquid phase. The platinum, approximately 0.88 pounds, which accumulates at the interphase, is drawn off and combined with the aforesaid platinum-containing residue for the recovery of platinum as chloroplatinic acid.

I claim as my invention:

1. A method for the recovery of platinum from a deactivated catalyst composite comprising platinum on an alumina support, which comprises the steps of digesting said composite in sulfuric acid to dissolve the alumina, separating the resultant aluminum sulfate solution from the undissolved platinum-containing residue, commingling said solution with a liquid trialkyl phosphate having from one to five carbon atoms in each of the alkyl groups, maintaining the resultant mixture at quiescent conditions to separate the same into upper and lower liquid layers with a platinum-containing residue at the interface, withdrawing the last-mentioned residue and combining the same with said undissolved platinum-containing residue from the digesting step, digesting the combined residues with aqua regia to dissolve the platinum and form chloroplatinic acid, and recovering said chloroplatinic acid.

2. The method of claim 1 further characterized in that said trialkyl phosphate is tributyl phosphate.

* * * * *